US008738415B2

(12) United States Patent
Sangroniz et al.

(10) Patent No.: US 8,738,415 B2
(45) Date of Patent: May 27, 2014

(54) AUTOMATED WORKFLOW ASSIGNMENT TO PRINT JOBS

(75) Inventors: James M. Sangroniz, Boise, ID (US); Jody Lee Terrill, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1193 days.

(21) Appl. No.: 10/395,795

(22) Filed: Mar. 24, 2003

(65) Prior Publication Data

US 2004/0193465 A1    Sep. 30, 2004

(51) Int. Cl.
*G06Q 10/00* (2012.01)

(52) U.S. Cl.
USPC ........................................................ 705/7.27

(58) Field of Classification Search
USPC .................................................... 705/8, 7.27
See application file for complete search history.

(56) References Cited

U.S. PATENT DOCUMENTS

| 4,970,554 | A |    | 11/1990 | Rourke |
| 5,718,520 | A |    | 2/1998  | MacKay |
| 6,173,295 | B1 |   | 1/2001  | Goertz et al. |
| 6,213,652 | B1 |   | 4/2001  | Suzuki et al. |
| 6,278,901 | B1 | * | 8/2001  | Winner et al. ........... 700/99 |
| 6,321,133 | B1 | * | 11/2001 | Smirnov et al. ......... 700/100 |
| 6,407,820 | B1 |   | 6/2002  | Hansen et al. |
| 6,411,314 | B1 |   | 6/2002  | Hansen et al. |
| 6,509,974 | B1 |   | 1/2003  | Hansen |
| 6,519,053 | B1 |   | 2/2003  | Motamed et al. |
| 6,546,364 | B1 | * | 4/2003  | Smirnov et al. ........... 703/22 |
| 6,805,502 | B2 | * | 10/2004 | Rai et al. ................. 400/61 |
| 2004/0066527 | A1 | * | 4/2004 | Kloosterman et al. ..... 358/1.15 |

OTHER PUBLICATIONS

Author Unknown, "Regular Expressions", The Single UNIX Specification, The Open Group, Version 2, Published on the Internet at http://www.opengroup.org/onlinepubs/7908799/xbd/re/html, 1997 (Month Unknown).
Hommel, Scott A., "Lesson: Regular Expressions", The JAVA(TM) Tutorial, Published on the Internet at http://java.sun.com/docs/books/tutorial/extra/regex/index.html, copyright 1995-2003, Publishing Date Unknown.
Author Unknown, "Regexp", The Apache Jakarta Project, Apache Software Foundation, Published on the Internet at http://Jakarta.apache.org/regexp/index.html, copyright 1999-2002 (Month unknown).
Clark et al., "XML Path Language (XPath)", Version 1.0, W3C, Published on the Internet at http://www.w3.org/TR/1999/REC-xpath-19991116, W3C Recommendation Nov. 16, 1999.
Authors Unknown, "JDF Specification", Published on the Internet at http://www.cip4.org/documents/jdf_specifications/jdf1.1a.pdf by the CIP4 (International Cooperation for Integration of Processes in Prepress, Press, and Postpress), Release 1.1, Revision A, Copyright 2000-2002.
James Sangroniz et al., U.S. Appl. No. 10/652,408, filed Aug. 29, 2003, (Related Application).

* cited by examiner

*Primary Examiner* — Andre Boyce

(57) ABSTRACT

Various systems, methods, and programs embodied in computer readable mediums are provided that facilitate the automated merger of print workflow information into job tickets that express the characteristics of a document to be printed. In various embodiments, a job ticket that describes a number of characteristics of a finished document to be printed is automatically modified in a processor-based system. The modifications are performed by merging at least a portion of a print workflow with the job ticket where the print workflow specifies a process to print the finished document.

30 Claims, 6 Drawing Sheets

AUTOMATED WORKFLOW ASSIGNMENT TO PRINT JOBS

BACKGROUND

The Internet and other networks have made it possible for individuals to submit print jobs to print shops for printing. It is now possible to transmit print jobs directly to print shops that can then print the documents and supply them to the sender for a fee. Such print jobs may include a job ticket that specifies particular characteristics about the document to be printed. Job tickets may be expressed, for example, using a Job Definition Format (JDF) that provides a standard for the expression of job tickets. Unfortunately, the print workflow is not typically included in such job tickets as every print shop may have unique print production facilities.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
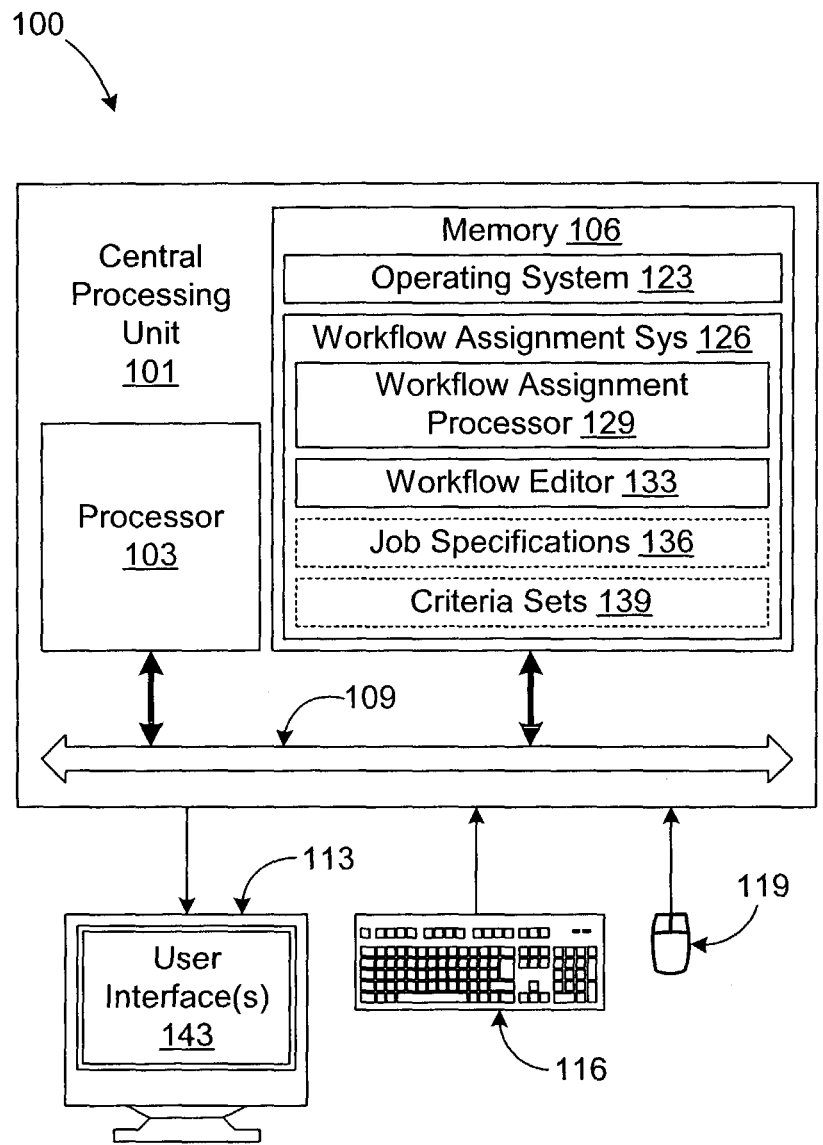
FIG. 1 is a schematic of a computer system upon which a workflow assignment processor and a workflow editor are executed according to an embodiment of the present invention.

With reference to FIG. 1, shown is a block diagram of a computer system 100 according to an embodiment of the present invention. Although the present invention is discussed in the context of a computer system 100, it is understood that devices other than a computer system with like capability may be employed. In this respect, the computer system 100 includes a central processing unit (CPU) 101 having a processor circuit with a processor 103 and a memory 106, both of which are coupled to a local interface 109. The local interface 109 may be, for example, a data bus with an accompanying control/address bus as can be appreciated by those with ordinary skill in the art. In this respect, the computer system 100 is a processor-based system. The computer system 100 also includes a number of peripheral devices such as, for example, a display device 113, a keyboard 116, and a mouse 119. The keyboard 116 and the mouse 119 may be manipulated to provide appropriate inputs into the central processing unit 101 as can be appreciated by those with ordinary skill in the art.

In addition, the computer system 100 may also include various other peripheral devices such as, for example, keypad, touch pad, touch screen, microphone, scanner, joystick, or one or more push buttons, etc. The peripheral devices may also include indicator lights, speakers, printers, etc. The display device 113 may be, for example, a cathode ray tube (CRT), liquid crystal display screen, gas plasma-based flat panel display, or other type of display device.

A number of various software components are stored in the memory 106 and are executable by the processor 103 according to an embodiment of the present invention. The software components may comprise, for example, an operating system 123 and a workflow assignment system 126. The workflow assignment system 126 includes a workflow assignment processor 129 and a workflow editor 133. In addition, a number of job specifications 136 and the number of criteria sets 139 are stored in the memory 106. Each of the job specifications 136 expresses a potential print workflow as will be discussed. During execution, the workflow assignment processor 129 may employ one or more of the job specifications 136 and the criteria sets 139 as will be discussed. Also, during execution, the workflow assignment processor 129 and the workflow editor 133 may generate one or more user interfaces 143 on the display device 113 to facilitate interaction with the user as can be appreciated by those with ordinary skill in the art.

The memory 106 is defined herein as both volatile and nonvolatile memory and data storage components. Volatile components are those that do not retain data values upon loss of power. Nonvolatile components are those that retain data upon a loss of power. Thus, the memory 106 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device. In addition, the memory 106 may exist inside or outside of the computer system 100.

In addition, the processor 103 may represent multiple processors and the memory 106 may represent multiple memories that operate in parallel. In such a case, the local interface 109 may be an appropriate network that facilitates communication between any two of the multiple processors, between any processor and any one of the memories, or between any two of the memories etc. The processor 103 may be of electrical, optical, or molecular construction, or of some other construction as can be appreciated by those with ordinary skill in the art.

The operating system 123 is executed to control the allocation and usage of hardware resources such as the memory, processing time and peripheral devices in the computer system 100. In this manner, the operating system 123 serves as the foundation on which applications depend as is generally known by those with ordinary skill in the art.

Figure 2:
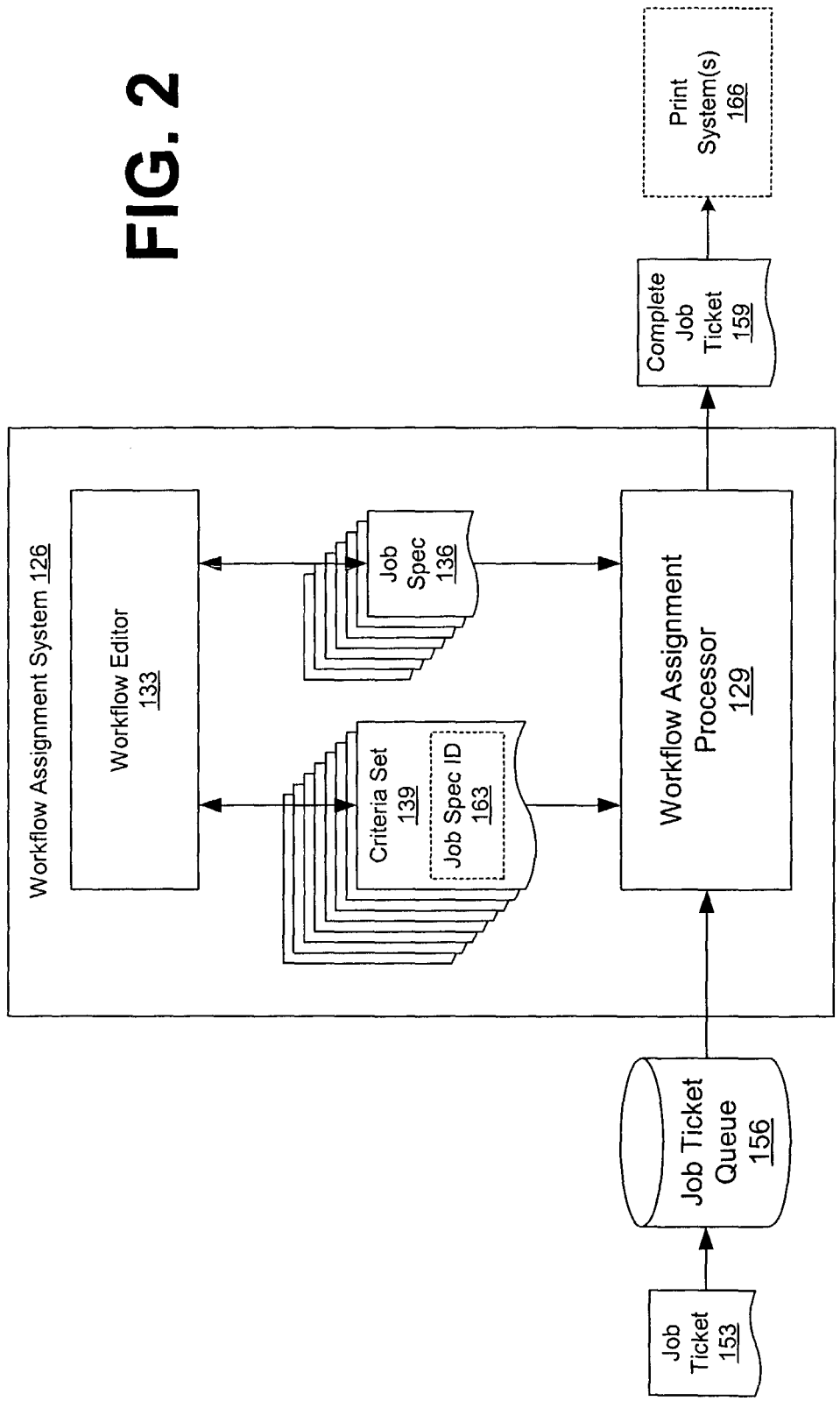
FIG. 2 is a functional block diagram that illustrates a workflow assignment operation implemented by the workflow assignment processor of FIG. 1 according to an embodiment of the present invention.

With reference to FIG. 2, shown is a functional block diagram that provides an example of the operation of the workflow assignment system 126 according to an embodiment of the present invention. In this respect, one or more job tickets 153 are received from individuals that are associated with a document to be printed. Each job ticket 153 that is received is stored in a job ticket queue 156. The workflow assignment processor 129 retrieves the job tickets 153 from the job ticket queue 156 for processing.

At the time that the job tickets 153 are received and stored in the job ticket queue 156, the job tickets 153 describe a number of characteristics of a finished document to be printed. Each of the job tickets 153 also includes, for example, a reference to the actual finished document to be printed. In this respect, the reference may be a location on a network as can be appreciated by those with ordinary skill in the art. Alternatively, the actual document or documents to be printed may be included as part of the job ticket 153.

The actual content of the job tickets 153 includes, for example, physical characteristics of the finished document as it is to be printed such as, size, paper type, color or black-and-white print designations, or other physical characteristics, etc. In addition, the job tickets 153 may also describe various parameters such as delivery requirements, billing information, or other information. In this respect, and the job tickets 153 may conform to the JDF Specification, Release 1.1, Revision A, copyright 2000-2002, as published by the CIP4 (International Cooperation for Integration of Processes in Prepress, Press, and Postpress). As such, the job tickets 153 may be expressed in Extensible Markup Language (XML) or other appropriate language.

While the job tickets 153 may describe the characteristics of a document to be printed, the job tickets 153 may not include a print workflow that describes the process undertaken to print the document in a print shop or other printing environment. The workflow assignment processor 129 operates to include a print workflow into each of the job tickets 153, thereby generating a "complete" job ticket 159. The workflow assignment processor 129 automatically modifies each of the job tickets 153 by merging at least a portion of a respective print workflow into the job tickets 153. In this manner, the workflow assignment processor 129 produces complete job tickets 159 that include both a description of the document to be printed as well as a print process that can be implemented to accomplish the printing of the document itself. Thus, as contemplated herein, a "complete job ticket" is one that expresses both information describing the document to be printed as well as a print workflow that is implemented in a predefined printing environment to accomplish the printing of the document.

In modifying the job tickets 153 to include respective print workflows therein, the workflow assignment processor 129 employs a number of criteria sets 139 and a number of job specifications 136. The criteria sets 139 each express criteria that may be compared with incoming job tickets 153 to determine whether the document to be printed, as expressed in each of the job tickets 153, qualifies for the application of a respective print workflow expressed in the corresponding job specification 136. In this respect, each of the criteria sets 139 includes a job specification identifier 163 that is associated with one of the job specifications 136. Thus, each of the criteria sets 139 is associated with a respective one of the job specifications 136. In addition, each of the job specifications 136 expresses a print workflow that may be employed to print a particular document based upon the requirements for printing such a document. To the extent that multiple job specifications 136 are stored in the memory 106, each one includes a potential print workflow that may be selected as the print workflow to be merged into a job ticket 153 to generate a complete job ticket 159.

Upon obtaining a job ticket 153 from the job ticket queue 156, the workflow assignment processor 129 compares each of the criteria sets 139, according to a predefined order with the content of the job ticket 153, to determine whether the job ticket 153 falls within the criteria outlined in one of the criteria sets 139. In this respect, each of the criteria sets 139 may be defined as a "Regular Expression". A "Regular Expression" is defined herein as an expression that employs a context-independent syntax that may represent a wide variety of character sets and character set orderings, where such character sets are interpreted according to a current locale. One type of regular expression that may be employed, for example, to express the criteria sets 139 are Xpath regular expressions that perform evaluation according to a Boolean true or false. Xpath is an industry standard Extensible Markup Language (XML) regular expression language that is further described with reference to Clark et al., "XML Path Language (XPath)," Version 1.0, W3C, published on the Internet at www.w3.org/TR/1999/REC-xpath-19991116, W3C recommendation 16 Nov. 1999. In this respect, an Xpath expression may be written to evaluate almost every possible condition of an incoming job ticket 153. Alternatively, each of the criteria sets 139 may be implemented using other expression languages or other programming languages as can be appreciated by those with ordinary skill in the art.

Once the workflow assignment processor 129 associates one of the criteria sets 139 with a job ticket 153, then the workflow assignment processor 129 draws an association between the criteria set 139 and the associated one of the job specifications 136 by virtue of the job specification identifier 163 associated with the respective criteria set 139. In this respect, the workflow assignment processor 129 identifies the job specification 136 expressing a desired print workflow from among a number of potential print workflows expressed in all the job specifications 136 stored in the memory 106 (FIG. 1).

Next, the workflow assignment processor 129 expresses the content of the job specification 136 or the print workflow expressed therein in the form of a first hierarchical data structure that has a number of first nodes. Also, the workflow assignment processor 129 expresses the content of the job ticket 153 in the form of a second hierarchical data structure that includes a number of second nodes. In this respect, the content of both the job specification 136 and the job ticket 153 may be expressed as Document Object Models (DOMs) using an appropriate parser as can be appreciated by those with ordinary skill in the art.

The workflow assignment processor 129 then proceeds to modify the respective job ticket 153 by merging portions of the print workflow expressed in the respective job specification 136 with the job ticket 153. In doing so, the workflow assignment processor 129 automatically identifies a number of matches between respective ones of the first and second nodes of the respective job ticket 153 and job specification 136 embodied in DOM format. In this respect, various matches between respective ones of the first and second nodes may be identified. In some cases, where matches between respective ones of the first and second nodes are identified, then the workflow assignment processor 129 may proceed to merge a number attributes of the matched pair of the first and second nodes. Also, if one of the first nodes in the job specification 136 cannot be matched with a corresponding second node in the job ticket 153, then the first node may be written into the job ticket 153.

Thus, the complete job ticket 159 is generated by merging various portions of the job specification 136 that expresses a print workflow into an appropriate incoming job ticket 153.

To find a match between one of the first nodes of the job specification 136 and one of the second nodes of the job ticket 153, workflow assignment processor 129 draws association between one of the first nodes and each one of a subset of the second nodes. The association may be drawn between the tags of the one of the first nodes and each one of the second nodes in the subset. Thereafter, the workflow assignment processor 129 identifies an unmatched one of the second nodes in the subset. To find the unmatched one of the second nodes in the subset, each of the second nodes in the subset may be examined in the order that such nodes appear in the DOM or other hierarchical data structure that expresses the job ticket 153. The workflow assignment processor 129 then designates a match between one of the first nodes and an unmatched one of the second nodes. In this respect, the match may be designated between the first node and the first unmatched one of the second nodes encountered in the subset.

The workflow assignment processor 129 then marks the unmatched one of the second nodes as having been matched in the job ticket 153 for purposes of future comparisons. The attributes of the matched first and second nodes are then merged. In merging the attributes of the first and second nodes, the workflow assignment processor 129 may employ one or more merger rules as will be described. Once the complete job ticket 159 is produced, then it is provided to appropriate printing systems 166 or workflow control systems, etc., to effect the printing of the document associated therewith in the respective print environment.

In addition, the workflow editor 133 provides for the creation of new job specifications 136 and new criteria sets 139 or for the modification or editing of existing job specifications 136 and existing criteria sets 139. In this respect, the workflow editor 133 allows the user to view a list of current criteria sets 139 stored in the memory 106. In addition, a user may delete job specifications 136 and criteria sets 139, and/or copy or clone existing job specifications 136 and criteria sets 139. Assuming that the workflow assignment processor 129 compares the criteria sets 139 with the job ticket 153 in a predefined order, then the workflow editor 133 also allows users to change the order in which the criteria sets 139 are considered by the workflow assignment processor 129.

The workflow assignment system 126 is very flexible in that any number of job specifications 136 and criteria sets 139 may be created that reflect the print capabilities of any print environment. Specifically, the workflow editor 133 facilitates the easy and flexible creation of print workflows that are associated to a specific print environment taking into account all of the print capabilities and systems of such an environment. Thus, one benefit of the workflow assignment system 126 is that it can easily be adapted to the operation of any print environment.

Figure 3:
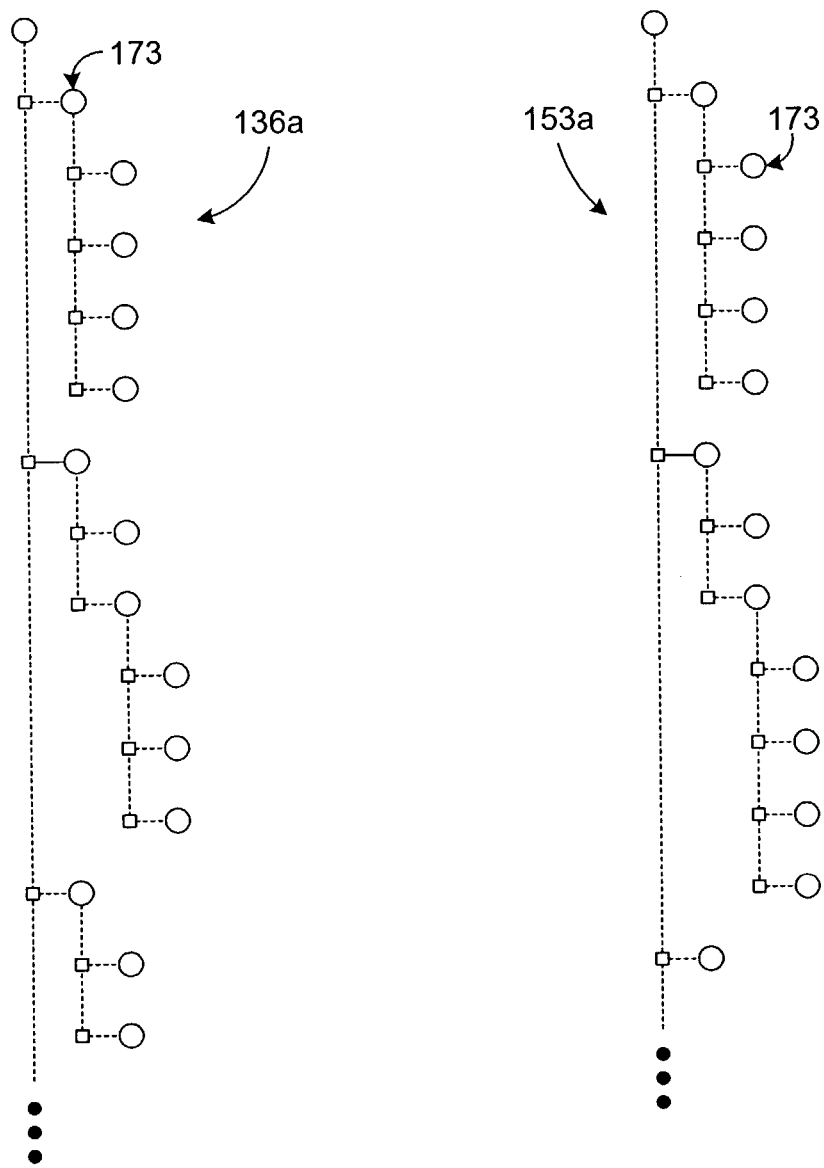
FIG. 3 is a drawing of hierarchical data structures such as Document Object Models employed by the workflow assignment processor of FIG. 1 according to an embodiment of the present invention.

With reference to FIG. 3, shown are block diagrams that illustrate an exemplary depiction a first hierarchical data structure 136a expressing a job specification 136. Also, the block diagrams illustrate a second hierarchical data structure 153a expressing a job ticket 153. According to one embodiment, the hierarchical data structures 136a and 153a may be, for example, Document Object Models (DOMs) or other similar data structures. In this respect, the hierarchical data structures 136a and 153a comprise tree structures, for example, that maintain interrelationships between various nodes 173 as can be appreciated by those with ordinary skill in the art. Each node may be expressed as tags, attributes, content items, and/or other information, as can be appreciated by those with ordinary skill in the art. In one embodiment, the first and second hierarchical data structures 136a and 153a may be generated from files expressed in Extensible Markup Language (XML) or other appropriate language.

Figure 4:
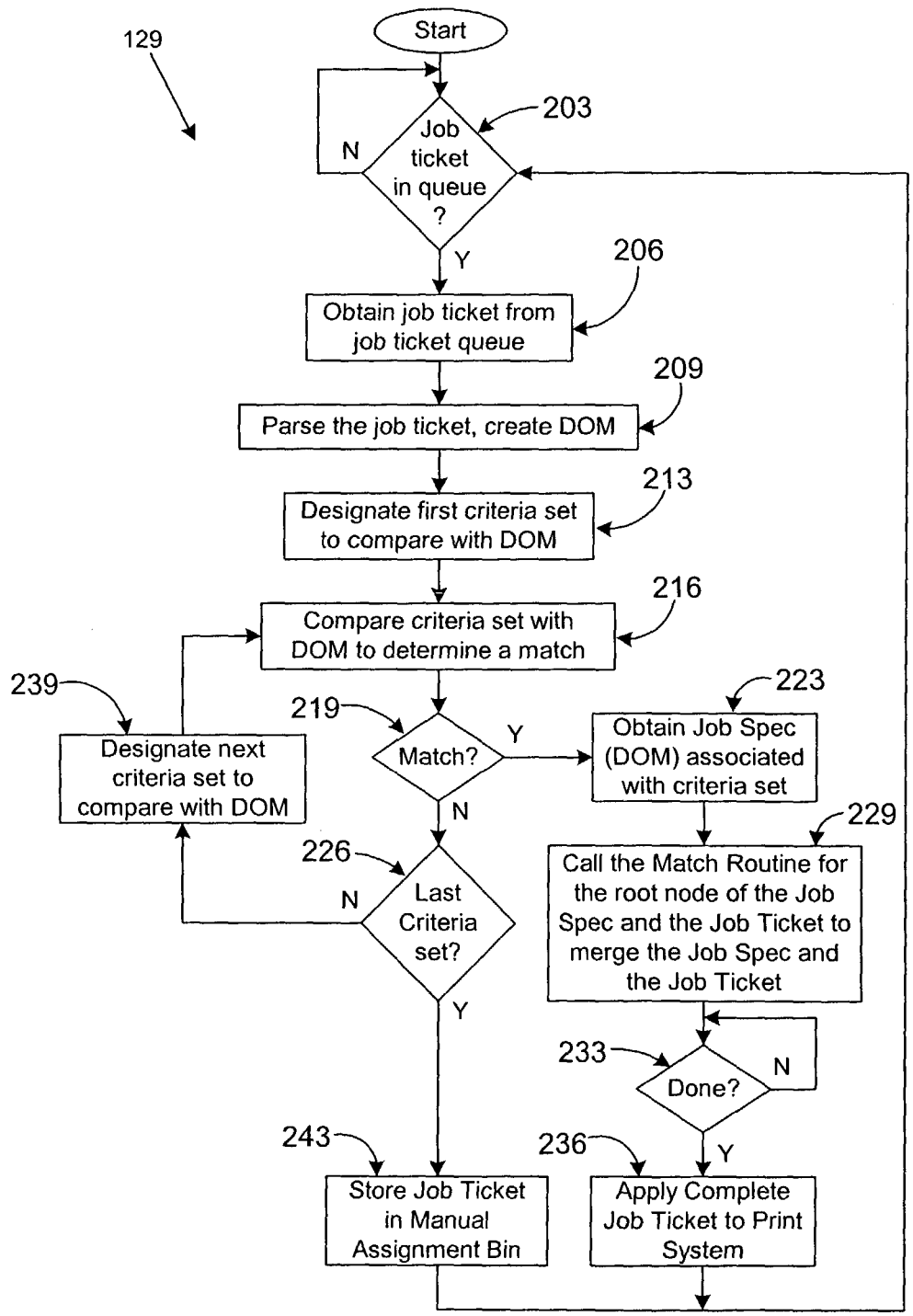
FIG. 4 is an exemplary flow chart that illustrates various functions of the workflow assignment processor of FIG. 1 according to an embodiment of the present invention.

Referring next to FIG. 4, shown is an exemplary flow chart of the workflow assignment processor 129 according to an embodiment of the present invention. Alternatively, the flow chart of FIG. 4 may be viewed as depicting steps of a method implemented in the computer system 100 to merge a print workflow into a job ticket 153 (FIG. 2). The functionality of the workflow assignment processor 129 as depicted by the exemplary flow chart of FIG. 4 may be implemented, for example, in an object-oriented design or in some other programming architecture. Assuming the functionality is implemented in an object oriented design, for example, then each block represents functionality that may be implemented in one or more methods that are encapsulated in one or more objects. The workflow assignment processor 129 may be implemented using any one of a number of programming languages such as, for example, C, C++, JAVA, Perl, Python, Flash, or other programming languages.

Beginning with box 203, the workflow assignment processor 129 waits until a job ticket 153 (FIG. 2) appears in the job ticket queue 156 (FIG. 2). Assuming that one or more job tickets 153 are stored in the job ticket queue 156, then the workflow assignment processor 129 proceeds to box 206 to retrieve one of the job tickets 153 from the job ticket queue 156. Thereafter, in box 209 the job ticket 153 is parsed and converted into a Document Object Model or other similar hierarchical data structure. In order to accomplish this, one of any number of parsers that are publicly available may be employed as can be appreciated by those with ordinary skill in the art. Thereafter, in box 213, a first one of the criteria sets 139 is designated for comparison with the newly created DOM that expresses the job ticket 153. In this respect, the first one of the criteria sets 139 is identified as being the first criteria set 139 among all of the criteria sets 139 that are considered in a predefined order.

Next, the workflow assignment processor 129 proceeds to box 216 to compare the current designated criteria set 139 with the job ticket 153 to determine if the job ticket 153 qualifies under the specific criteria within the criteria set 139 such that a match exists. In box 219, if it is determined that a match exists, then the workflow assignment processor 129 proceeds to box 223. Otherwise, the workflow assignment processor 129 progresses to box 226.

In box 223 the workflow assignment processor 129 obtains the job specification 136 that is associated with the current designated criteria set 139. The specific job specification 136 may be identified by examining the job specification identifier 163 (FIG. 2) associated with the current designated criteria set 139. Upon retrieval of the job specification 136, a parser is employed to convert the job specification 136 into a Document Object Model for further manipulation unless the job specification 136 is already expressed in the form of the Document Object Model or other hierarchical data structure.

Thereafter, in box 229 the workflow assignment processor 129 calls a "Match Routine" for the root node of both the job specification 136 and the job ticket 153. Then, in box 233, the workflow assignment processor 129 waits until the complete job ticket 159 (FIG. 2) has been created. Assuming that such is the case, then the workflow assignment processor 129 proceeds to box 236 in which the complete job ticket 159 is applied to an appropriate print system 166 for printing. Thereafter, the workflow assignment processor 129 reverts back to box 203.

With reference back to box 219, if no match is found between the current designated criteria set 139 and the job ticket 153 (in DOM format), then in box 226 the workflow assignment processor 129 determines whether the last criteria set 139 that is stored in the workflow assignment system 126 has been considered in box 216. If not, then the workflow assignment processor 129 moves to box 239. Otherwise, the workflow assignment processor 129 proceeds to box 243.

In box 239, the workflow assignment processor 129 designates the next one of the criteria sets 139 according to the predetermined order for comparison with the current job ticket 153. Thereafter, the workflow assignment processor 129 reverts back to box 216.

Assuming that the last criteria set 139 has been considered in box 226, then the workflow assignment processor 129 proceeds to box 243 in which the job ticket 153 is stored in a manual assignment bin in the memory 106 (FIG. 1) so that it may be accessed at a later time for manual assignment of an appropriate print work flow. Thereafter, the workflow assignment processor 129 reverts back to box 203 as shown.

Figure 5:
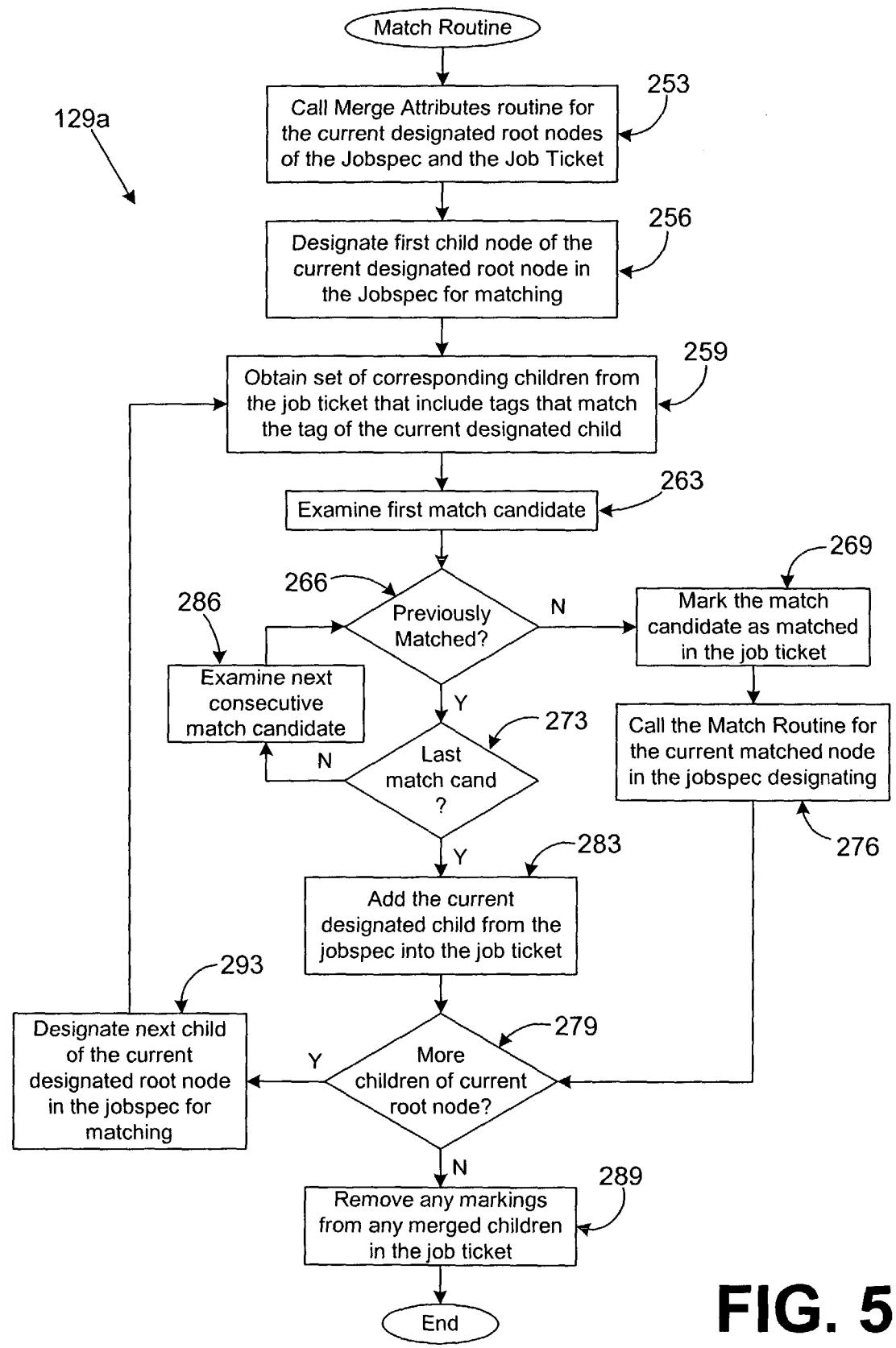
FIG. 5 is an exemplary flow chart that illustrates the functionality of a recursive match routine portion of the workflow assignment processor of FIG. 1 according to an embodiment of the present invention.

With reference to FIG. 5, shown is an exemplary flowchart of the Match Routine 129*a* that is a recursive routine is called as a portion of the workflow assignment processor 129 (FIG. 4). Alternatively, the flow chart of FIG. 5 may be viewed as depicting further steps of a method implemented to merge a print workflow into a job ticket 153. The functionality of the Match Routine 129*a* as depicted by the exemplary flow chart of FIG. 5 may be implemented, for example, in an object oriented design or in some other programming architecture. Assuming the functionality is implemented in an object-oriented design, then each block represents functionality that may be implemented in one or more methods that are encapsulated in one or more objects. The Match Routine 129*a* may be implemented using any one of a number of programming languages such as, for example, C, C++, JAVA, Perl, Python, Flash, or other programming languages.

Beginning with box 253, the Match Routine 129*a* calls a "Merge Attributes" routine to merge the attributes of the current designated root nodes of the job specification 136 (FIG. 2) and the job ticket 153 (FIG. 2), as expressed in DOM format or other hierarchical data structure. Thereafter, in box 256 a first child node of the current designated root node in the job specification 136 is designated for matching. Then, in box 259 a subset of the nodes in the second hierarchical data structure 153*a* that comprise the corresponding children of the current root node of the job ticket 153 that match the first child the node of the job specification 136 designated in box 256 are identified.

Each of the children within the subset is designated as a "match candidate" to be compared with the current child node of the job specification 136 designated in box 256. Such matches are determined, for example, by similarity between the tags of the corresponding children nodes of the job ticket 153 and the tag of the current designated child of the job specification 136. Once the subset of the children nodes are obtained from the job ticket 153, then in box 263 a first one of the children nodes in the subset is examined to determine whether it has previously been matched with a corresponding node in the job specification 136. If not, then the Match Routine 129*a* proceeds to box 269. Otherwise, the Match Routine 129*a* progresses to box 273.

In box 269, if a match is not identified in box 226, then the current match candidate is marked within the job ticket 153 as having been matched with a node from the job specification 136. The mark may comprise a predefined sequence of characters, etc. Thereafter, in box 276, a recursive call is made to the Match Routine 129*a* for the current matched node in the job specification 136. Thereafter, the Match Routine 129*a* proceeds to box 279.

Referring back to box 266, if it is determined that the current match candidate has been previously matched with a node from the job specification 136 as evidenced by an appropriate mark in the job ticket 153, then the Match Routine 129*a* proceeds to box 273. In box 273, the Match Routine 129*a* determines whether the last match candidate in the subset has been considered in box 266. If so, then the Match Routine 129*a* proceeds to box 283. Otherwise, the Match Routine 129*a* proceeds to box 286. In box 283, since no matching candidate has been found for the current child node of the job specification 136 from the job ticket 153, then the current designated child node from the job specification 136 is added or written into the job ticket 153. In this manner, the portion of the print work flow expressed in the current designated child node of the job specification 136 is merged into the job ticket 153. Thereafter, the Match Routine 129*a* proceeds to box 279.

With reference back to box 273, assuming that there are further Match candidates to consider in box 266, then the Match Routine 129*a* proceeds to box 286 in which the next consecutive match candidate from the subset is examined to determine whether it has previously been matched with a respective node from the job specification 136. Thereafter, the Match Routine 129*a* reverts back to box 266.

Assuming that the Match Routine 129*a* proceeds to box 279, then the Match Routine 129*a* determines whether there are more children of the current root node of the job specification 136 for which a matching one of the nodes of the job ticket 153 is to be found. If not, then the Match Routine 129*a* proceeds to box 289. Otherwise, the Match Routine 129*a* moves to box 293. In box 289, the Match Routine 129*a* removes any markings from any of the merged nodes of the job ticket 153 that were created in box 269. The result is the creation of a complete job ticket 159 (FIG. 2). Thereafter, the Match Routine 129*a* ends as shown. Assuming that additional children exist in box 279, then in box 293, the Match Routine 129*a* designates the next child node of the current designated root node of the job specification 136 for matching. In this respect, the children of the current root node of the job specification 136 are considered in the order in which they appear. Thereafter, the Match Routine 129*a* reverts back to box 259.

Figure 6:
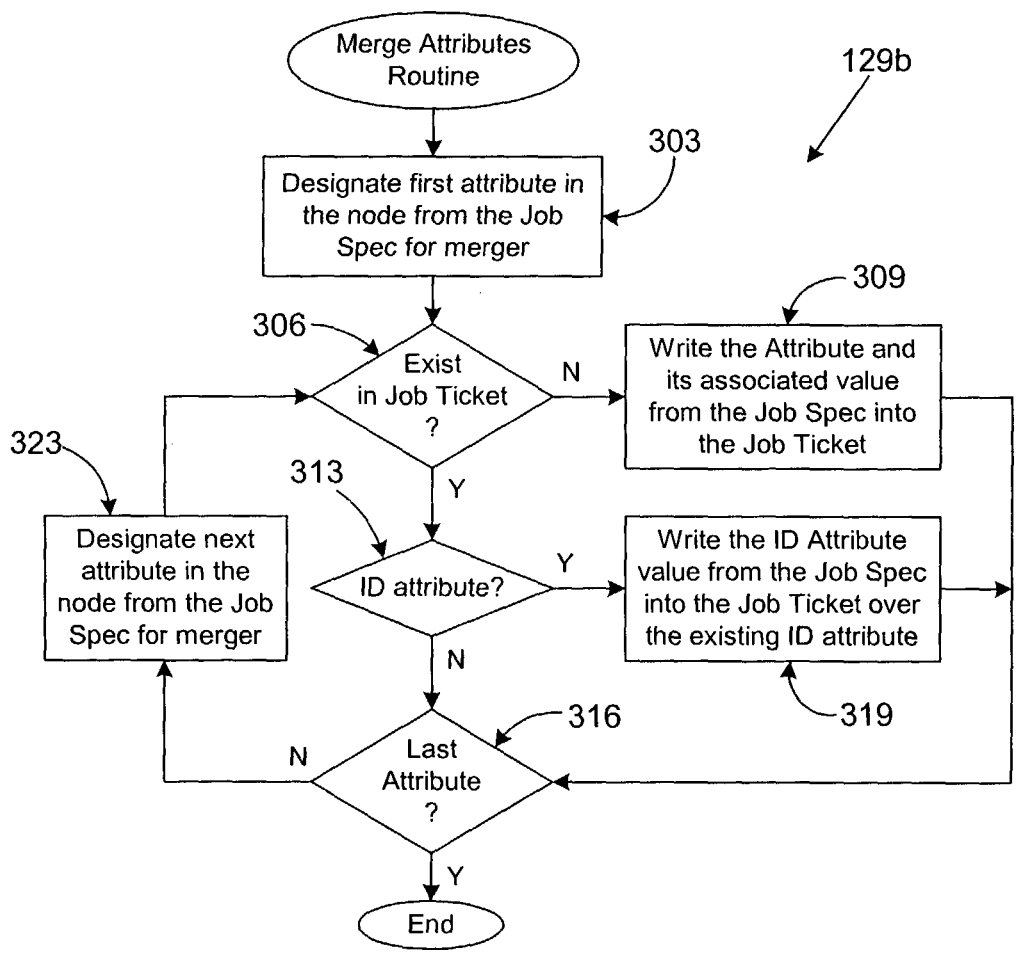
FIG. 6 is an exemplary flow chart that illustrates the functionality of a merge attributes routine portion of the workflow assignment processor of FIG. 1 according to an embodiment of the present invention.

With reference to FIG. 6, shown is an exemplary flowchart of a "Merge Attributes Routine" 129*b* that is a portion of the workflow assignment processor 129 that is called in box 253 (FIG. 5) of the Match Routine 129*a* (FIG. 5). Alternatively, the flow chart of FIG. 6 may be viewed as depicting further steps of a method implemented in the computer system 100 to merge a print workflow into a job ticket 153. The functionality of the Merge Attributes Routine 129*b* as depicted by the exemplary flow chart of FIG. 6 may be implemented, for example, in an object-oriented design or in some other programming architecture. Assuming the functionality is implemented in an object oriented design, for example, then each block represents functionality that may be implemented in one or more methods that are encapsulated in one or more objects. The Merge Attributes Routine 129*b* may be implemented using any one of a number of programming languages such as, for example, C, C++, JAVA, Perl, Python, Flash, or other programming languages.

The Merge Attributes Routine 129*b* implements a set of rules for the merger of attributes for matched nodes of the job specification 136 and the job ticket 153. In summary, the rules are as follows:

1) Where an attribute exists in node in the job specification 136, but not in the matching node in the job ticket 153, then the attribute is written into the job ticket.

2) Where an attribute exists in both the corresponding nodes in the job specification 136 and the job ticket 153, and the attribute is an "ID" attribute, then the attribute and its value from the job specification 136 are written over the same in the job ticket 153 to preserve the ID for the job specification 136.

3) Where an attribute exists in both the corresponding nodes in the job specification 136 and the job ticket 153, and the attribute is not an "ID" attribute, then the attribute that already exists in the respective node in the job ticket 153 is left untouched.

With these rules in mind, the Merge Attributes Routine 129b is described. Beginning with box 303, a first attribute in the current node from the job specification 136 is designated to be merged into a matching node in the job ticket 153 (FIG. 2). Thereafter, in box 306, the merge attributes routine 129b determines whether the current designated attribute from the job specification 136 (FIG. 2) exists within the job ticket 153. If not, then the merge attributes routine 129b proceeds to box 309. Otherwise, the merge attributes routine 129b moves to box 313. In box 309, the merge attributes routine 129b writes the current designated attribute from the job specification 136 and its associated value into the job ticket 153. Thereafter, the merge attributes routine 129b proceeds to box 316.

Referring back to box 306, if the current designated attribute in the job specification 136 already exists in the job ticket 153, then the merge attributes routine 129b proceeds to box 313 in which it is determined whether the attribute is an "ID" attribute. If so, then the merge attributes routine 129b proceeds to box 319. Otherwise, the merge attributes routine 129b proceeds to box 316. In box 319, the merge attributes routine 129b writes the ID attribute value from the job specification 136 over the existing value of the existing ID Attribute within the job ticket 153. This is because all ID attributes of the job specification 136 need to be preserved in order to insure proper linkages between various print processes that make up the workflow expressed in the respective job specification 136. Thereafter, the merge attributes routine 129b proceeds to box 316.

In box 316, the merge attributes routine 129b determines whether the last attribute of the current node from the job specification 136 has been considered for merger into the job ticket 153. If so, then the merge attributes routine 129b ends accordingly. Otherwise, the merge attributes routine 129b proceeds to box 323 in which the next attribute within the current node from the job specification 136 is designated for consideration to be merged in the job ticket 153. Thereafter, the merge attributes routine 129b reverts back to box 306 as shown.

Although the workflow assignment system 126 is embodied in software or code executed by general purpose hardware as discussed above, as an alternative the workflow assignment system 126 may also be embodied in dedicated hardware or a combination of software/general purpose hardware and dedicated hardware. If embodied in dedicated hardware, the workflow assignment system 126 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram and/or flow charts of FIGS. 2 and 4-6 show the architecture, functionality, and operation of an implementation of the workflow assignment system 126 including the workflow assignment processor 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagram and/or flow charts of FIGS. 2 and 4-6 show a specific order of execution, it is understood that the order of execution may differ from that which is depicted. For example, the order of execution of two or more blocks may be scrambled relative to the order shown. Also, two or more blocks shown in succession in FIGS. 2 and 4-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the workflow assignment system 126 (including the workflow assignment processor 129) comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the workflow assignment system 126 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A print workflow assignment method, comprising:
receiving, at a workflow assignment processor, a job ticket that describes a number of characteristics of a finished document to be printed;
with the workflow assignment processor, expressing a content of a print workflow as a first document object model (DOM), the first DOM comprising a number of first nodes in a first hierarchical data structure;
with the workflow assignment processor, expressing a content of the job ticket as a second document object model (DOM), the second DOM comprising a number of second nodes in a second hierarchical data structure,
modifying the job ticket by merging a number of the first nodes of the first DOM with the second DOM, and
printing a finished document based on the modified job ticket.

2. The method of claim 1, further comprising:
storing a number of potential print workflows in a memory in the processor based system, each of the potential print workflows specifying a process to print a predefined document; and identifying the print workflow from among the potential print workflows.

3. The method of claim 2, further comprising storing a number of criteria sets in the memory in the processor based system, wherein each of the criteria sets is associated with one of the potential print workflows.

4. The method of claim 3, further comprising expressing each of the criteria sets as a regular expression.

5. The method of claim 3, wherein identifying the print workflow from among the potential print workflows further comprises:
drawing an association between one of the criteria sets and the job ticket; and
identifying the print workflow from among the potential print workflows as being associated with the one of the criteria sets.

6. The method of claim 1, in which modifying the job ticket by merging a number of the first nodes of the first DOM with the second DOM further comprises writing one of the first nodes into the second DOM if none of the second nodes matches the one of the first nodes.

7. The method of claim 1, in which modifying the job ticket by merging a number of the first nodes of the first DOM with the second DOM further comprises:
identifying a number of matches between respective nodes of the first and second DOMs; and
merging a number of attributes of matched pairs of the first and second nodes.

8. The method of claim 7, in which modifying the job ticket by merging a number of the first nodes of the first DOM with the second DOM further comprises:
identifying each of the matches by:
drawing an association between one of the first nodes and each one of a subset of the second nodes;
identifying an unmatched one of the second nodes in the subset; and
designating a match between the one of the first nodes and the unmatched one of the second nodes.

9. The method of claim 8, wherein identifying the unmatched one of the second nodes in the subset further comprises identifying a first unmatched one of the second nodes in the subset.

10. The method of claim 8, further comprising marking the unmatched one of the second nodes as matched in the second DOM after designating the match between the unmatched one of the second nodes and the respective one of the first nodes.

11. The method of claim 1, further comprising:
comparing a number of criteria sets with the job ticket to determine if one of the criteria sets matches the job ticket, each of the criteria sets being associated with a respective one of a number of print workflows; and
with a workflow editor, creating a new criteria set and a corresponding new print workflow if one of the criteria sets does not match the job ticket.

12. A system for assigning print workflow, comprising:
a processor;
a memory;
a job ticket stored in the memory, the job ticket describing a number of characteristics of a finished document to be printed; and
a workflow assignment processor that:
retrieves the job ticket from the memory;
converts the job ticket into a first document object model (DOM), the first DOM comprising a number of first nodes in a first hierarchical data structure; and
compares the first DOM with a number of criteria sets to determine if a match exists between the first DOM and one of a number of the criteria sets,
in which each of the criteria sets is associated with one of a number of job specifications, and
in which the job specifications define a print workflow utilized to print the finished document.

13. The system of claim 12, in which the workflow assignment processor further converts the job specification into a second document object model (DOM), the second DOM comprising a number of second nodes in a second hierarchical data structure,
in which the second DOM expresses content of the print workflow in the number of second nodes.

14. The system of claim 13, in which the workflow assignment processor further merges the attributes of the nodes of the second document object model (DOM) into the first document object model (DOM) in a hierarchal order.

15. The system of claim 14, in which the workflow assignment processor writes one of the second nodes into the first DOM if none of the first nodes matches the one of the second nodes.

16. The system of claim 14, in which the workflow assignment processor further identifies a number of matches between respective ones of the first and second nodes and merges a number of attributes of matched pairs of the first and second nodes.

17. The system of claim 14, in which the workflow assignment processor further sends the finished document to a printing system communicatively coupled to the workflow assignment processor that prints the finished document based on the merged attributes of the first DOM and second DOM.

18. A system for assigning print workflow, comprising:
a workflow assignment processor that compares a first document object model (DOM) representing a job ticket that describes a number of characteristics of a finished document to be printed with a number of criteria sets to determine if a match exists between the first DOM and one of the criteria sets; and
a workflow editor that creates a new criteria set and a corresponding new job specification if one of the criteria sets does not match the first DOM.

19. The system of claim 18, in which the job specification defines
a print workflow, the print workflow specifying a process to print the finished document.

20. The system of claim 19, in which each of the criteria sets are associated with one of a number of original job specifications.

21. The system of claim 20, further comprising:
a job specification identifier for identifying an original job specification from among the potential original job specifications as being associated with the one of the criteria sets.

22. The system of claim 18, further comprising:
a first document object model (DOM) that expresses content of the job ticket in a number of first nodes; and
a second document object model (DOM) that expresses content of the job specification in a number of second nodes.

23. The system of claim 22, in which the workflow assignment processor modifies the job ticket by writing one of the second nodes into the first DOM if none of the first nodes matches the one of the second nodes.

24. The system of claim 22, in which the workflow assignment processor modifies the job ticket by:
identifying a number of matches between respective nodes of the first and second DOMs; and
merging a number of attributes of matched pairs of the first and second nodes.

25. A computer program product for assigning print workflow, the computer program product comprising:
a non-transitory computer readable medium comprising computer usable program code embodied therewith, the computer usable program code comprising:
computer usable program code that, when executed by a processor, causes the processor to retrieve a job ticket;
computer usable program code that, when executed by the processor, causes the processor to compare a number of criteria sets with the job ticket to determine if one of the criteria sets matches the job ticket;
computer usable program code that, when executed by the processor, causes a workflow editor to create a new criteria set and a corresponding new job specification if one of the criteria sets does not match the job ticket;
computer usable program code that, when executed by the processor, causes the processor to define a content of a print workflow as a first document object model (DOM), the first DOM comprising a number of first nodes in a first hierarchical data structure;
computer usable program code that, when executed by the processor, causes the processor to define a content of the job ticket as a second document object model (DOM), the second DOM comprising a number of second nodes in a second hierarchical data structure, and
computer usable program code that, when executed by the processor, causes the processor to modify the job ticket by merging a number of the first nodes of the first DOM with the second DOM if one of the criteria sets does match the job ticket.

26. The computer program product of claim 25, in which the computer usable program code that, when executed by the processor, causes the processor to modify the job ticket by merging a number of the first nodes of the first DOM with the second DOM if one of the criteria sets does match the job ticket further comprises computer usable program code that, when executed by the processor, causes the processor to write one of the first nodes into the second DOM if none of the second nodes matches the one of the first nodes.

27. The computer program product of claim 25, in which the computer usable program code that, when executed by the processor, causes the processor to modify the job ticket by merging a number of the first nodes of the first DOM with the second DOM if one of the criteria sets does match the job ticket further comprises:
computer usable program code that, when executed by the processor, causes the processor to identify a number of matches between respective nodes of the first and second DOMs; and
computer usable program code that, when executed by the processor, causes the processor to merge a number of attributes of matched pairs of the first and second nodes.

28. The computer program product of claim 27, in which the computer usable program code that, when executed by the processor, causes the processor to modify the job ticket by merging a number of the first nodes of the first DOM with the second DOM if one of the criteria sets does match the job ticket further comprises:
computer usable program code that, when executed by the processor, causes the processor to identify each of the matches, further comprising:
computer usable program code that, when executed by the processor, causes the processor to draw an association between one of the first nodes and each one of a subset of the second nodes;
computer usable program code that, when executed by the processor, causes the processor to identify an unmatched one of the second nodes in the subset; and
computer usable program code that, when executed by the processor, causes the processor to designate a match between the one of the first nodes and the unmatched one of the second nodes.

29. The computer program product of claim 28, in which the computer usable program code that, when executed by the processor, causes the processor to identify the unmatched one of the second nodes in the subset further comprises computer usable program code that, when executed by the processor, causes the processor to identify a first unmatched one of the second nodes in the subset.

30. The computer program product of claim 28, further comprising computer usable program code that, when executed by the processor, causes the processor to mark the unmatched one of the second nodes as matched in the second DOM after designating the match between the unmatched one of the second nodes and the respective one of the first nodes.

* * * * *